US012626727B2

(12) United States Patent
Baughman et al.

(10) Patent No.: US 12,626,727 B2
(45) Date of Patent: May 12, 2026

(54) SYNCING COMMENTARY WITH VIDEOS

(71) Applicant: INTERNATIONAL BUSINESS MACHINES CORPORATION, Armonk, NY (US)

(72) Inventors: Aaron Keith Baughman, Cary, NC (US); Leonid Karlinsky, Acton, MA (US); Gozde Akay, Fredericton (CA); Eduardo Morales, Key Biscayne, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/911,777

(22) Filed: Oct. 10, 2024

(65) Prior Publication Data

US 2026/0105936 A1 Apr. 16, 2026

(51) Int. Cl.
*G11B 27/00* (2006.01)
*G06F 40/169* (2020.01)
(Continued)

(52) U.S. Cl.
CPC ............ *G11B 27/10* (2013.01); *G06F 40/169* (2020.01); *G06F 40/30* (2020.01);
(Continued)

(58) Field of Classification Search
CPC ......... G11B 27/10; G06F 40/30; G06V 20/46; G06V 20/41; G96V 10/82
(Continued)

(56) References Cited

U.S. PATENT DOCUMENTS

| 10,678,855 B2 | 6/2020 | Vaughn et al. |
| 10,825,480 B2 | 11/2020 | Marco et al. |

(Continued)

FOREIGN PATENT DOCUMENTS

CN 109769132 A 5/2019

OTHER PUBLICATIONS

Chan et al., "Automatic Linguistic Resolution: Framework and Applications," IEEE Xplore, 1996, pp. 625-630.
(Continued)

*Primary Examiner* — Daquan Zhao
(74) *Attorney, Agent, or Firm* — Seed Intellectual Property Law Group LLP

(57) ABSTRACT

Systems, methods, and computer program products for automatically syncing commentary with videos are described herein. A method comprises reading a sequence of frames of a video; generating frame documents based on the sequence of frames; reading commentary associated with the video; providing the commentary as input to a language model; reading embeddings generated by the language model based on the commentary; generating a commentary document in accordance with the embeddings; determining a semantic distance between the commentary document and each of the frame documents; selecting a subset of the set of frame documents having the lowest semantic distance to the commentary document; identifying a consecutive subsequence of the sequence of frames associated with the subset; providing at least two frames of the consecutive subsequence and the embeddings as input to a diffusion model; and reading a first frame generated by the diffusion model.

20 Claims, 3 Drawing Sheets

200

(51) Int. Cl.

| | |
|---|---|
| *G06F 40/30* | (2020.01) |
| *G06V 10/77* | (2022.01) |
| *G06V 10/82* | (2022.01) |
| *G06V 20/40* | (2022.01) |
| *G11B 27/036* | (2006.01) |
| *G11B 27/10* | (2006.01) |
| *H04N 21/81* | (2011.01) |

(52) U.S. Cl.
CPC .......... *G06V 10/7715* (2022.01); *G06V 10/82* (2022.01); *G06V 20/41* (2022.01); *G06V 20/46* (2022.01); *G11B 27/036* (2013.01); *H04N 21/8133* (2013.01)

(58) Field of Classification Search
USPC ........................................ 386/248, 239, 278
See application file for complete search history.

(56) References Cited

U.S. PATENT DOCUMENTS

| | | | |
|---|---|---|---|
| 11,012,662 B1 | 5/2021 | Baughman et al. | |
| 11,455,576 B2 | 9/2022 | Dalli et al. | |
| 11,521,655 B2 | 12/2022 | Baughman et al. | |
| 2022/0172050 A1 | 6/2022 | Dalli et al. | |
| 2023/0018621 A1* | 1/2023 | Lin .......................... | A63F 13/85 |
| 2023/0214422 A1 | 7/2023 | Kwatra et al. | |
| 2025/0111803 A1* | 4/2025 | Mace ...................... | G06F 3/167 |

OTHER PUBLICATIONS

Chan et al., "Symbolic Connetionism in Natural language Disambiguation," IEEE Transactions on Neural Networks, Sep. 1998, pp. 739-755, vol. 9, No. 5.

Hassid et al., "More than words: In-the-wild visually-driven prosody for text-to-speech." In Proceedings of the IEEE/CVF Conference on Computer Vision and Pattern Recognition, pp. 10587-10597 (2022).
Li et al., "Scallop: A Language for Neurosymbolic Programming," Proc. ACM Program. Lang. 7, PLDI, Article 166, 25 pages, (2023).
Lin et al., "Feature Pyramid Networks for Object Detection," arXiv 1612.03144v2 (2017): 10 pages.
Lu et al., "High-Quality Automatic Voice Over with Alignment: Supervision through Self-Supervised Discrete Speech Units." arXiv preprint arXiv:2306.17005 (2023).
Lu et al., "Visualtts: TTS With Accurate Lip-Speech Synchronization for Automatic Voice Over," 2022 International Conference on Acoustics, Speech and Signal Processing (ICASSP), pp. 8032-8036 (2022).
Yurochkin et al., "Hierarchical optimal transport for document representation." Advances in neural information processing systems 32 (2019).
Jack Bantoc, "The Masters app, website feature AI commentary for tournament coverage", https://edition.cnn.com/2023/04/07/golf/the-masters-ai-commentary-spt-intl/index.html, Apr. 7, 2023, 9 pages.
Moss et al., "Sounding liquids: Automatic sound synthesis from fluid simulation", ACM Transactions on Graphics (TOG), Jul. 2, 2010, 13 pages.
No Author, "Text generation strategies", https://web.archive.org/web/20240222011056/https://huggingface.co/docs/transformers/v4.27.2/en/generation_strategies, Feb. 22, 2024, 9 pages.
Pranav Dixit, "Game, set and AI: Wimbledon 2023 will see AI commentary for the first time in tennis with help of IBM", https://www.businesstoday.in/technology/news/story/game-set-and-ai-wimbledon-2023-will-see-ai-commentary-for-the-first-time-in-tennis-with-help-of-IBM-388438-2023-07-06, Jul. 6, 2023, 10 pages.
Saha et al., "TinyNS: Platform-aware Neurosymbolic Auto Tiny Machine Learning", ACM Transactions on Embedded Computing Systems, May 11, 2024, 48 pages.

* cited by examiner

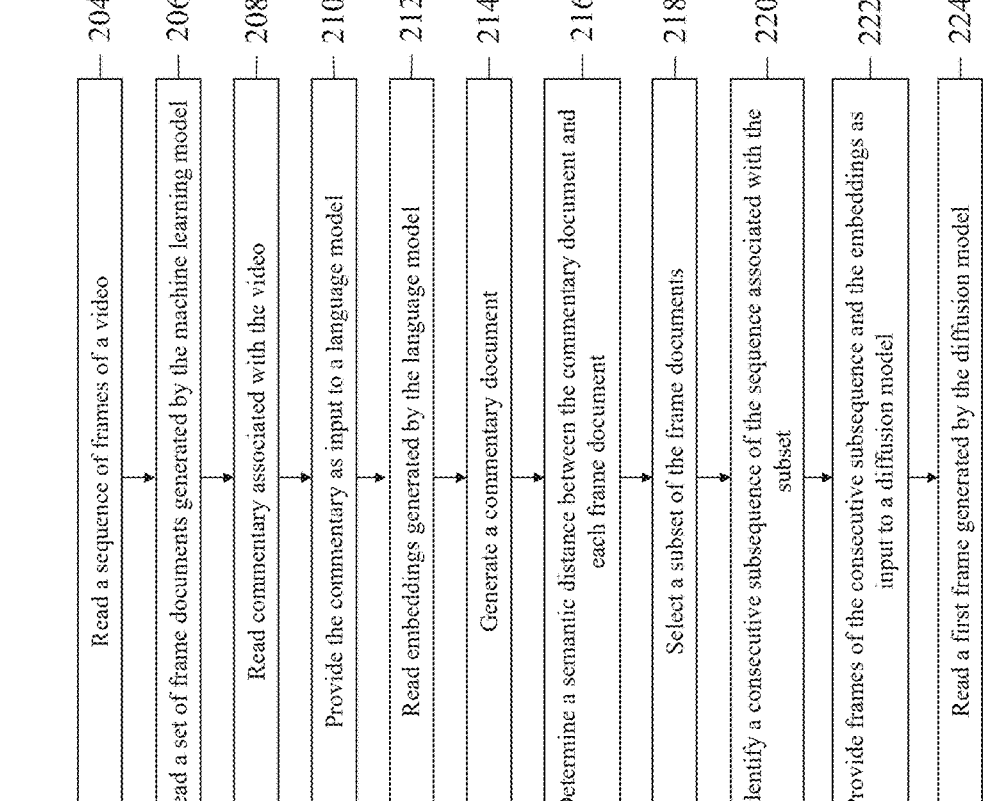

200

204 — Read a sequence of frames of a video

206 — Read a set of frame documents generated by the machine learning model

208 — Read commentary associated with the video

210 — Provide the commentary as input to a language model

212 — Read embeddings generated by the language model

214 — Generate a commentary document

216 — Determine a semantic distance between the commentary document and each frame document 218 — Select a subset of the frame documents 220 — Identify a consecutive subsequence of the sequence associated with the subset 222 — Provide frames of the consecutive subsequence and the embeddings as input to a diffusion model 224 — Read a first frame generated by the diffusion model

FIG. 2

SYNCING COMMENTARY WITH VIDEOS

BACKGROUND

Embodiments of the present disclosure relate to automatically syncing commentary with videos.

SUMMARY

According to embodiments of the present disclosure, methods of, computer program products for, and computer systems for syncing commentary with videos are disclosed. A method for syncing commentary with videos may comprise reading a sequence of frames of a video. The method may comprise providing each frame of the sequence of frames as input to a machine learning model. The method may comprise reading a set of frame documents generated by the machine learning model based on the sequence of frames. Each frame document of the set of frame documents may correspond to at least one of the frames of the sequence of frames. The method may comprise reading commentary associated with the video. The method may comprise providing the commentary as input to a language model. The method may comprise reading embeddings generated by the language model based on the commentary. The embeddings may characterize the commentary. The method may comprise generating a commentary document in accordance with the embeddings.

The method may comprise determining a semantic distance between the commentary document and each of the frame documents. The method may comprise selecting a subset of the set of frame documents having the lowest semantic distance to the commentary document. The method may comprise identifying a consecutive subsequence of the sequence of frames associated with the subset. The method may comprise providing at least two consecutive frames of the sequence of frames and the embeddings as input to a diffusion model. The consecutive subsequence may comprise the at least two consecutive frames. The method may comprise reading a first frame generated by the diffusion model.

BRIEF DESCRIPTION OF THE DRAWINGS

FIG. 2 is a flow diagram depicting an exemplary method for syncing commentary with videos, in accordance with one or more embodiments of this disclosure.

DETAILED DESCRIPTION

Commentary can be generated of any length about a discrete event within a live streamed video using artificial intelligence. The commentary can be presented using a media streaming service. The commentary can also be embedded within Videos on Demand (VOD) for distribution around the world. Using current methods, when embedding audio files for the commentary into a video, graphical and audio syncing is, at most, approximate. Further, the audio files for the commentary may not be the correct duration for the video. For example, the sound may describe multiple discrete events during depiction of only one event when the visual scene for the single discrete event is too short for the commentary. For example, if the scene length depicting a discrete event is too short for the commentary, the commentary may need to be omitted. A few manual processes have been devised to extract highlights from the commentary during graphic side cars. The majority of such commentary is embedded into the video's based on point time statistics. Frequently, the point timing is missing or not accurate. In some events, the timing data is too broad for the accurate introduction of precise commentary for specific moments. As such, a way to automatically sync generated commentary with increased accuracy and efficiency is desired. In some implementations, the method for syncing the commentary must be completed during a live stream of a real-world or virtual event. In such implementations, the audio files for the commentary must be embedded in the video instantaneously or nearly instantaneously. Such methods, as described herein, automatically and accurately embed the audio files for commentary into videos. Further, the methods described herein, automatically extend scene length of the video and/or generate shorter commentary as needed to accurately synchronize the video with the commentary.

Figure 1:
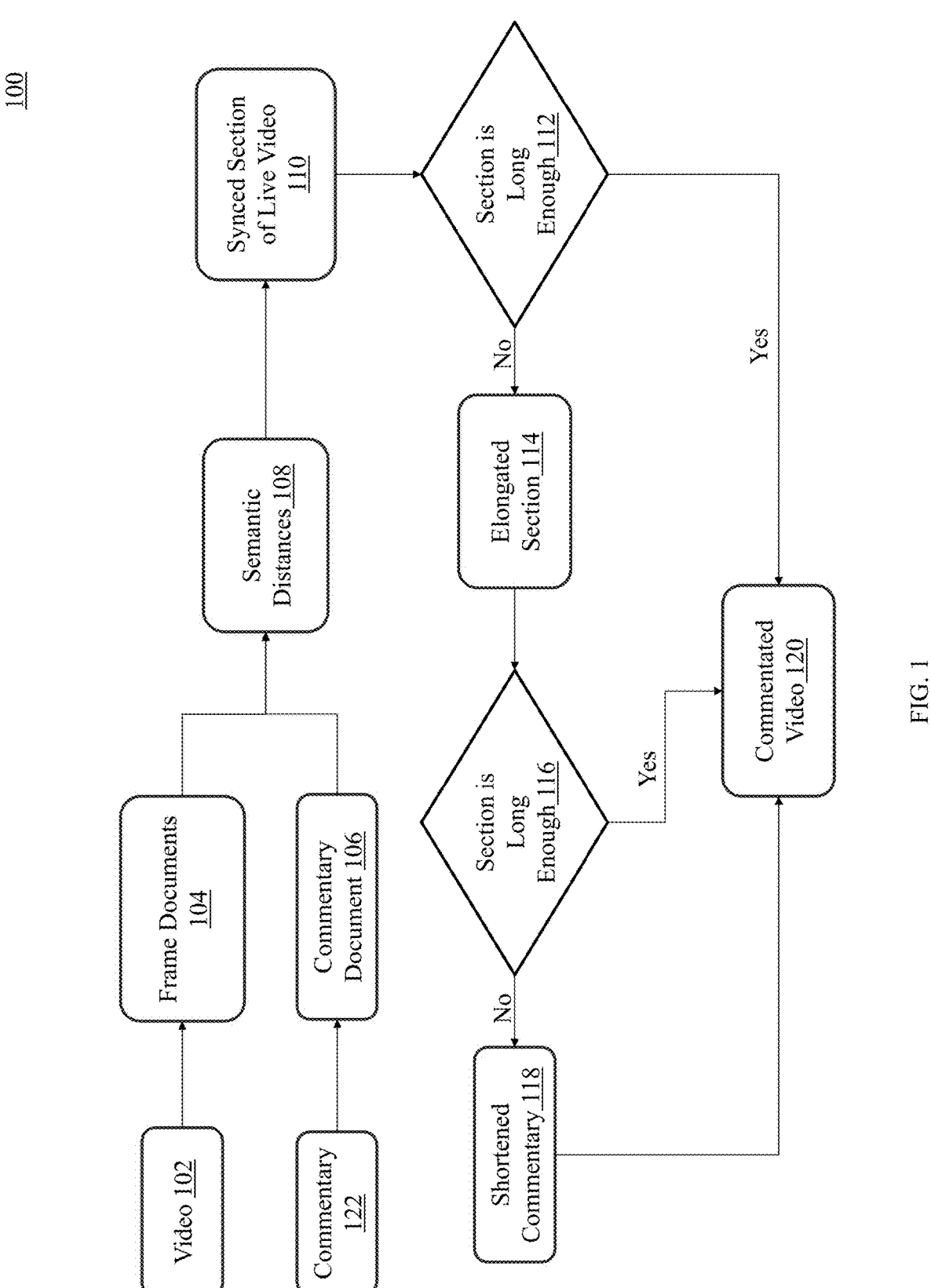
FIG. 1 is a block diagram depicting an exemplary process for syncing commentary with videos, in accordance with one or more embodiments of this disclosure.

FIG. 1 is a block diagram illustrating an exemplary process 100 for syncing commentary with videos according to one or more exemplary embodiments of the present disclosure. In some implementations, process 100 is implemented in one or more processing devices (e.g., a digital processor, an analog processor, a digital circuit designed to process information, a state machine, and/or other mechanisms for electronically processing information). The one or more processing devices may include one or more devices configured through hardware, firmware, and/or software to be specifically designed for execution of one or more of the operations of process 100.

Process 100 may comprise reading video 102. Video 102 may comprise a sequence of frames, audio, and/or other information. Each frame of the sequence of frames may be an image. Reading video 102 may comprise reading the sequence of frames. In some implementations, video 102 is received via a network. Video 102 may be segmented into a sequence of frames. Each frame may be an image. Each frame of the sequence of frames may have at least one neighboring frame. For example, the first frame and the last frame of the sequence of frames have one neighboring frame. For example, all other frames of the sequence of frames comprise two neighboring frames. A frame may neighbor another frame by virtue of the frames being consecutive frames within the sequence.

Video 102 may be a live stream, a previously recorded video, and/or a combination thereof. For example, video 102 may depict a live event with clips of replays interspersed. In some implementations, reading video 102 comprises receiving reading each frame of video 102 as it is received and/or captured. In some implementations, reading the sequence of frames comprises receiving each frame during a stream of video 102. In some implementations, reading video 102 comprises reading a frame with at least one of its neighbors during a live stream of video 102.

Process 100 may comprise providing video 102 as input to a machine learning model. Providing video 102 as input may comprise providing each frame of the sequence of frames as input to the machine learning model. The machine learning model may be configured to generate a feature map based on one or more input images. The machine learning model may be a feature pyramid network, a convolutional neural network, and/or another machine learning model configured to generate feature maps.

Process 100 may comprise providing one or more frames of video 102 as input to the machine learning model at a time. For example, two consecutive frames may be provided as input to the machine learning model. For example, an anchor frame and the neighbor(s) of the anchor frame are provided as input to the machine learning model. The one or more frames may be concatenated prior to being provided as input to the machine learning model. In such implementations, the concatenation may be provided as input to the machine learning model as a single image.

In some implementations, anchor frame is provided as input to the machine learning model separately from its neighboring frame(s). In some implementations, the anchor frame is provided as a pyramid of images to a convolutional neural network. The pyramid of images may be a lowpass pyramid, a bandpass pyramid, and/or another type of pyramid.

In some implementations, a feature map is generated by the machine learning model for the anchor frame based on the anchor frame and/or the neighbor(s) of the anchor frame. The feature map generated for the anchor frame may be a feature pyramid and/or another type of feature map. In some implementations, each level of the feature pyramid comprises a feature map characterizing an individual frame provided as input. In some implementations, the feature pyramid is the pyramidal feature hierarchy computed by the machine learning model based on an input image. For example, the bottom-most level of the feature pyramid comprises a feature map characterizing the anchor frame. In some implementations, semantic value of the relation between recognized objects in the frame may be higher at higher levels of the feature pyramid. The feature map may characterize one or more objects depicted in the at least one frame, semantic relationship among the object(s), and/or other information. A feature map may be generated by the machine learning model for each frame of video 102. The feature pyramid may characterize and/or track small objects depicted in video 102. Process 100 may comprise reading one or more feature maps generated by the machine learning model.

Process 100 may comprise generating frame documents 104. Generating frame documents 104 may comprise reading one or more feature maps generated by the machine learning model. Frame documents 104 may be generated in accordance with the feature maps. In some implementations, a frame document is generated for each feature map. As such, each frame document may correspond to a frame of video 102. For example, a frame document corresponding to a frame of video 102 characterizes the visual representation of the frame. The characterization may comprise characterizations of one or more objects depicted in the frame. In some implementations, the characterization characterizes motion of one or more objects depicted in the frame.

In such implementations, the frame documents are generated based on the frame, at least one neighboring frame, and/or another frame. In some implementations, the frame document comprises embeddings characterizing objects depicted within the frame. The characterization may be based on one or more other frames of video 102 and their relation to the frame. The embeddings may be word embeddings, sentence embeddings, document embeddings, image embeddings, graph embeddings, and/or another type of embedding. In some implementations, the embeddings are contextual. An individual frame document 104 for a frame of video 102 may be a distribution over topics associated with the frame. The topics may be distributions over words. The topics may be defined by a topic model. The topics may be corpus specific.

In some implementations, commentary 122 may characterize natural language. For example, commentary 122 characterizes one or more scenes of video 102. In some implementations, commentary 122 may comprise a playlist file, an audio file, and/or another file type. The playlist file may comprise one or more audio files. The playlist file may be of any playlist file format including, but not limited to, PLS, M3U, M3U8, XSPF, and XML Shareable Playlist Format. Commentary 122 may be an audio file included in a playlist file. For example, the audio file characterizes a particular scene of video 102 and the playlist file comprises characterizations of each scene of video 102. The audio files of commentary 122 may characterize an audio representation of commentary 122. The audio representation may resemble naturally spoken language. For example, the audio representation of commentary 122 has a prosody and/or speed that mimics a human voice. In some implementations, commentary 122 is read in the form of embeddings. In some implementations, commentary 122 comprises a string of characters.

Commentary 122 may have been generated by one or more machine learning models, generated manually, and/or a combination thereof. The one or more machine learning models may comprise a transformer model, a T4 model, a Sandstone model, a Granite model, and/or another machine learning model. Commentary 122 may have been generated based on video 102. In some implementations, commentary 122 characterizes at least one event depicted by video 102. For example, video 102 depicts a golf tournament and commentary 122 characterizes a swing performed by a competitor during the golf tournament. For further example, commentary 122 characterizes the trajectory of the golf ball following the swing.

Process 100 may comprise generating commentary document 106. Generating commentary document 106 may comprise providing commentary 122 as input to a language model. The language model may be a machine learning model. The language model may be a large language model and/or another machine learning model suited for natural language processing. The language model may be configured to generate embeddings for natural language text. For example, the language model may be a document-to-vector model. In some implementations, generating commentary document 106 may comprise reading embeddings for commentary 122 generated by the language model. Commentary document 106 may be generated in accordance with the embeddings characterizing commentary 122.

In some implementations, commentary document 106 may be generated at the same time as or at substantially the same time as frame documents 104. Commentary document 106 may characterize commentary 122. Commentary document 106 may be a distribution over topics. Generating commentary document 106 may comprise querying terms associated with each topic from the embeddings. Commentary document 106 and frame documents 104 may be distributions over the same set of topics.

Process 100 may comprise determining semantic distances 108. Each semantic distance 108 may be a semantic distance between a frame document 104 and a commentary document 106. In some implementations, semantic distances 108 are the hierarchical optimal transport distances between frame documents 104 and commentary document 106. Other methods for determining semantic distances 108 may include, but are not limited to, word mover's distance, cosine similarity, discrete optimal transport, using a contextual language model, latent semantic analysis, and topic modeling.

Process 100 may comprise identifying a synced section 110 of video 102. Identifying synced section 110 may comprise selecting a subset of the set of frame documents 104 having the lowest semantic distance to the commentary document. A sliding window algorithm may be used to select the subset. The window may be of a fixed size or a variable size. Identifying synced section 110 may comprise identifying a consecutive subsequence of the sequence of frames associated with the subset. The consecutive subsequence may be a portion of video 102 that is characterized by commentary 122.

Process 100 may comprise determination 112. Determination 112 may comprise determining whether synced section 110 is long enough for commentary 122. In some implementations, the length of synced section 110 is determined based on a duration of time required for presentation of synced section 110 at a particular frame rate. The particular frame rate may be the frame rate at which video 102 was filmed, a lower frame rate, and/or another frame rate used for presentation of videos. In some implementations, the length of synced section 110 is determined based on the number of frames included in synced section 110. The length of commentary 122 may be determined based on a time duration of an audio representation of commentary 122, a number of words of commentary 122, and/or another measure. Synced section 110 may be long enough for commentary 122 if the entirety of audio representation of commentary 122 can be presented during presentation of synced section 110 at the particular frame rate.

Process 100 may comprise generating elongated section 114. Elongated section 114 may be generated responsive to determining synced section 110 is not long enough at determination 112. Generating elongated section 114 may comprise providing at least two frames of the consecutive subsequence, the embeddings, one or more frames generated by a diffusion model and/or other information as input to the diffusion model. The diffusion model may be a type of machine learning model. For example, the last frame of video 102, one or more other frames of video 102, and/or other information are provided as input to the diffusion model.

Generating elongated section 114 may comprise reading one or more frames generated by the diffusion model. For example, a first frame and a second frame may be read. Generating elongated section 114 may comprise determining whether the most recently generated frame and the previously generated frame are equivalent. For example, generating elongated section 114 may comprise determining whether the first frame and the second frame are equivalent. Two frames may be equivalent if all pixels of both frames are identical, if at least a specified proportion of the pixels are identical, and/or if a specified proportion of the pixels are similar. For example, similar pixels may have color values within a specified range.

Generating elongated section 114 may comprise determining whether a number of frames greater than or equal to an insertion threshold have been generated by the diffusion model. The insertion threshold may define a maximum number of frames to be generated for insertion into a video. In some implementations, another frame may be generated as described herein if neither of such determinations are determined to be true.

Generating elongated section 114 may comprise inserting the one or more frames generated by the diffusion model into video 102. The one or more frames may be inserted within the sequence of frames. In some implementations, the one or more frames are inserted between any two consecutive frames of the sequence of frames. The one or more frames may be inserted between any two frames provided as input to the diffusion model. For example, the one or more frames are inserted between the last frame of the sequence of frames and the neighbor frame of the last frame. In some implementations, the one or more frames are inserted into the sequence of frames such that each of the one or more frames are consecutive. In some implementations, the one or more frames are inserted separately from each other within the sequence of frames. The one or more frames may be inserted into the sequence of frames in any configuration. For example, the one or more frames may be inserted between a frame included in synced section 110 and another frame of video 102. In some implementations, the one or more frames may only be inserted between frames of synced section 110.

Video 102 may be modified by virtue of the generation of elongated section 114. By way of non-limiting example, elongated section 114 may replace synced section 110 in video 102. In some implementations, video 102 does not appear to have been modified during presentation of video 102 as modified. In some implementations, video 102 is modified such that video 102 is elongated without modifying the subject of synced section 102. In the example of synced section 110 depicting a player's swing in a golf tournament, video 102 may be modified to include a depiction of the scenery after the ball has come to rest. For example, the scenery may appear to be realistic and live. Video 102 may be associated with a frame rate at which the sequence of frames is intended to be presented. The frame rate may be increased, decreased, and/or maintained. In some implementations, the frame rate may be modified such that video 102 appears slowed down. For example, the frame rate is adjusted for elongated section 114 and maintained for the rest of video 102.

Process 100 may comprise determination 116. Determination 116 may comprise determining whether elongated section 114 is long enough for commentary 122. In some implementations, the length of elongated section 114 is determined based on a duration of time required for presentation of elongated section 114 at a particular frame rate. In some implementations, the length of elongated section 114 is determined based on the number of frames included in elongated section 114. Elongated section 114 may be long enough for commentary 122 if the entirety an audio representation of commentary 122 can be presented during presentation of synced section 110 at a particular frame rate.

Process 100 may comprise generating shortened commentary 118. Generating shortened commentary 118 may comprise providing a prompt, a characterization of synced section 110, a characterization of elongated section 114, commentary 122, and/or other information as input to a generative machine learning model. The prompt may indicate a maximum or target length of shortened commentary 118. The length may be a duration of an audio representation of shortened commentary 118, a number of words in shortened commentary 118, and/or another unit. Generating shortened commentary 118 may comprise reading shortened commentary 118 as generated by the generative machine learning model.

Process 100 may comprise generating commentated video 120. Generating commentated video 120 may comprise synchronizing (or aligning) a section of video 102 with commentary (e.g., commentary 122 or shortened commentary 118). Synchronizing the section with the commentary may comprise aligning the start, end, and/or one or more anchor points within the section with the start, end, and/or one or more anchor points of the commentary. The anchor points of the section and the commentary may be determined in accordance with the prosody of speech for the commentary. The anchor points of the section and the commentary may be determined automatically and/or manually. The anchor points of the section and the commentary may be determined based on a semantic interpretation of each frame of synced section 110, a semantic interpretation of each frame of elongated section 114, the semantic meaning of commentary 122, the semantic meaning of shortened commentary 118, and/or other information. As such, the anchor points of the section and the commentary may be determined in accordance with embeddings for frame documents 104 for the frames of synced section 110, embeddings for commentary 122, embeddings for shortened commentary 118, and/or other information.

For example, generating commented video 120 comprises aligning synced section 110 with an audio representation of commentary 122. Such an alignment may be responsive to determining synced section 110 is long enough at determination 112. For example, generating commented video 120 comprises aligning elongated section 114 with the audio representation of commentary 122. Such an alignment may be responsive to determining elongated section 114 is long enough at determination 116. For example, generating commented video 120 comprises aligning elongated section 114 or synced section 110 with an audio representation of shortened commentary 118.

Process 100 may comprise transmitting commented video 120 for presentation via a client computing platform. In some implementations, commented video 120 is transmitted a negligible amount of time after filming of commented video 120. For example, commented video 120 is transmitted to the client computing platform less than 5 minutes after the events depicted by commented video 120 occurred. In some implementations, commented video 120 is transmitted to the client computing platform after filming of video 120 has been completed in its entirety. By way of non-limiting example, video 102 depicts a sporting event. Commented video 120 may be generated and/or transmitted to the client computing platform after the sporting event has concluded.

In some implementations, process 100 is repeated for each discrete event (or scene) and/or only some of the discrete events depicted in live video 102. In the example of live video 102 depicting a golf tournament, process 100 may be repeated for all, some, or just one swing filmed during the tournament.

FIG. 2 is a flowchart illustrating an exemplary method 200 for syncing commentary with videos according to one or more exemplary embodiments of the present disclosure. The operations of method 200 presented below are intended to be illustrative. In some implementations, method 200 is accomplished with one or more additional operations not described and/or without one or more of the operations discussed. Additionally, the order in which the operations of method 200 are illustrated in FIG. 2 and described below is not intended to be limiting.

In some implementations, method 200 is implemented in one or more processing devices (e.g., a digital processor, an analog processor, a digital circuit designed to process information, an analog circuit designed to process information, a state machine, and/or other mechanisms for electronically processing information). The one or more processing devices may include one or more devices configured through hardware, firmware, and/or software to be specifically designed for execution of one or more of the operations of method 200.

Operation 204 comprises reading a sequence of frames of a video. Operation 206 comprises generating a set of frame documents based on the sequence of frames. Each frame document of the set of frame documents may correspond to at least one of the frames of the sequence of frames. Operation 208 comprises reading commentary associated with the video. Operation 210 comprises providing the commentary as input to a language model. Operation 212 comprises reading embeddings generated by the language model based on the commentary. The embeddings may characterize the commentary. Operation 214 comprises generating a commentary document in accordance with the embeddings. Operation 216 comprises determining a semantic distance between the commentary document and each of the frame documents. Operation 218 comprises selecting a subset of the set of frame documents having the lowest semantic distance to the commentary document. Operation 220 comprises identifying a consecutive subsequence of the sequence of frames associated with the subset. Operation 222 comprises providing at least two frames of the consecutive subsequence of frames and the embeddings as input to a diffusion model. Operation 224 comprises reading a first frame generated by the diffusion model.

Figure 3:
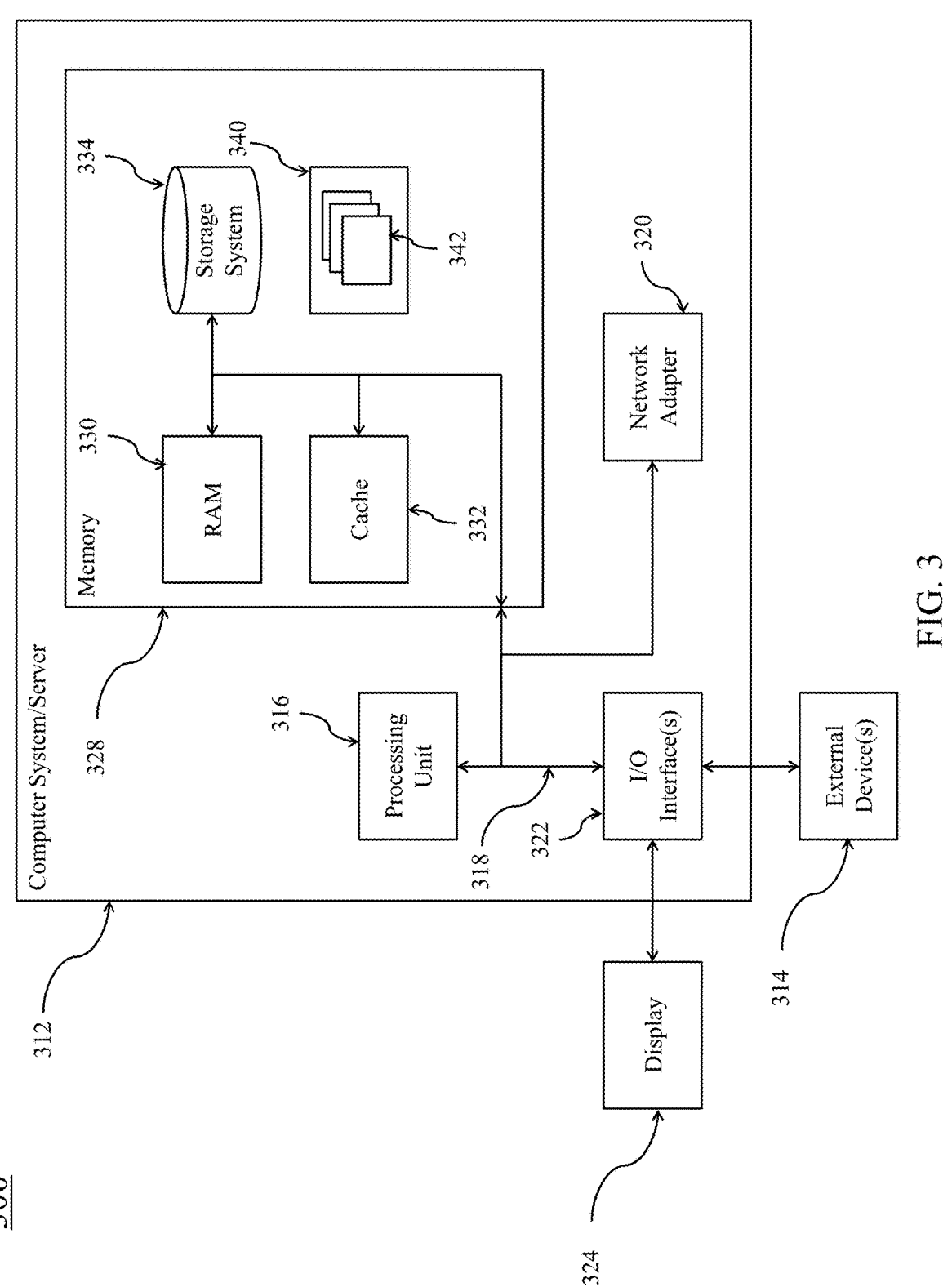
FIG. 3 is a schematic diagram of a computing node, in accordance with one or more embodiments of the present disclosure.

Referring now to FIG. 3, a schematic of an example of a computing node is shown. Computing node 310 is only one example of a suitable computing node and is not intended to suggest any limitation as to the scope of use or functionality of embodiments described herein. Regardless, computing node 310 is capable of being implemented and/or performing any of the functionality set forth hereinabove.

In computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 312 typically includes a variety of computer system readable media. Such media may be any available media that is accessible by computer system/server 412, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the disclosure.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In various embodiments, the one or more machine learning models, described herein, may be and/or may include a dynamic programming algorithm and/or model, such as a dynamic linear programming algorithm/model or a dynamic nonlinear programming algorithm/model. In various embodiments, the one or more machine learning models, described herein, may be a trained classifier. In various embodiments, the trained classifier may be a random decision forest. However, it will be appreciated that a variety of other classifiers are suitable for use according to the present disclosure, including linear classifiers, support vector machines (SVM), or artificial neural network models, such as generative adversarial networks (GANs) and/or recurrent neural networks (RNNs).

Suitable artificial neural network models include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network. In various embodiments, the one or more machine learning models described herein may be trained using data as described herein and/or data available from public and/or private databases and/or data stores.

Reference has been made in detail herein to the exemplary embodiments of the present disclosure, examples of which are illustrated in the accompanying drawings. The systems, devices, and methods disclosed herein are described in detail by way of examples, and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

For any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel. For any methods described, regardless of whether the method is described in conjunction with a flow diagram, it should be understood that one or more additional steps may be performed during the execution of a method. For any methods described, regardless of whether the method is described in conjunction with a flow diagram, it should be understood that one or more steps described may be omitted during the execution of a method.

In various embodiments, a vector of features that includes machine learning model input(s) may be provided to one or more of the machine learning models described herein. Based on the input features, one or more of the machine learning models described herein may generate one or more outputs. In some embodiments, the output(s) of the one or more machine learning models described herein may be a vector of features.

In various embodiments, the one or more machine learning models, described herein, may be pre-trained using training data. In various embodiments training data may be retrospective data. In various embodiments, the retrospective data may be stored in a datastore. In various embodiments, the one or more machine learning models, described herein, may be additionally trained through manual curation of previously generated outputs.

In various embodiments, the one or more machine learning models, described herein, may be and/or may include a dynamic programming algorithm and/or model, such as a dynamic linear programming algorithm/model or a dynamic nonlinear programming algorithm/model. In various embodiments, the one or more machine learning models, described herein, may be a trained classifier. In various embodiments, the trained classifier may be a random decision forest. However, it will be appreciated that a variety of other classifiers are suitable for use according to the present disclosure, including linear classifiers, support vector machines (SVM), or artificial neural network models, such as generative adversarial networks (GANs) and/or recurrent neural networks (RNNs).

Suitable artificial neural network models include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network. In various embodiments, the one or more machine learning models described herein may be trained using data available from public and/or private databases and/or data stores.

As used herein, the term "exemplary" is used in the sense of "example," rather than "ideal." Moreover, the terms "a" and "an" herein do not denote a limitation of quantity, but rather denote the presence of one or more of the referenced items.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
reading a sequence of frames of a video;
generating a set of frame documents based on the sequence of frames, wherein each frame document of the set of frame documents corresponds to at least one of the frames of the sequence of frames;
reading commentary associated with the video;
providing the commentary as input to a language model;
reading embeddings generated by the language model based on the commentary, wherein the embeddings characterize the commentary;
generating a commentary document in accordance with the embeddings;

determining a semantic distance between the commentary document and each of the frame documents;
selecting a subset of the set of frame documents having the lowest semantic distance to the commentary document;
identifying a consecutive subsequence of the sequence of frames associated with the subset;
providing at least two frames of the consecutive subsequence and the embeddings as input to a diffusion model; and
reading a first frame generated by the diffusion model.

2. The computer-implemented method of claim 1, wherein reading the sequence of frames comprises individually receiving each frame during a stream of the video.

3. The computer-implemented method of claim 1, wherein a first frame document corresponding to a first frame is a distribution over topics associated with the first frame.

4. The computer-implemented method of claim 1, wherein providing each frame of the sequence of frames as input to the machine learning model comprises providing the at least two consecutive frames as input to the machine learning model.

5. The computer-implemented method of claim 1, wherein generating the set of frame documents comprises:
providing each frame of the sequence of frames as input to a machine learning model;
reading a feature map generated by the machine learning model based on at least one frame of the sequence of frames, wherein the feature map characterizes objects depicted in the at least one frame and semantic relationships among the objects; and
generating the frame document in accordance with the feature map.

6. The computer-implemented method of claim 1, the computer-implemented method further comprising:
providing the first frame and an end frame as input to the diffusion model, wherein the at least two consecutive frames comprise the end frame;
reading a second frame generated by the diffusion model;
determining whether the first frame and the second frame are equivalent; and
determining whether a number of frames greater than or equal to an insertion threshold have been generated.

7. The computer-implemented method of claim 1, the computer-implemented method further comprising:
inserting the first frame into the sequence of frames such that the video is modified.

8. The computer-implemented method of claim 7, the computer-implemented method further comprising:
synchronizing an audio representation of the commentary with the video in accordance with the consecutive subsequence; and
transmitting the video for presentation via a client computing platform.

9. The computer-implemented method of claim 1, wherein the machine learning model is a Feature Pyramid Network.

10. The computer-implemented method of claim 1, the computer-implemented method further comprising:
providing a prompt and a characterization of the consecutive subsequence as input to a generative machine learning model, wherein the prompt indicates a duration of a shortened commentary to be generated.

11. The computer-implemented method of claim 1, the computer-implemented method further comprising determining whether a length of the commentary is greater than a length of the consecutive subsequence, wherein the at least two consecutive frames of the sequence of frames and the embeddings are provided as input to the diffusion model responsive to determining the length of the commentary is greater than the length of the consecutive subsequence.

12. A computer program product for syncing commentary with videos, the computer program product comprising:

one or more non-transitory computer-readable storage media;

program instructions stored on the one or more non-transitory computer-readable storage media to perform operations comprising:

reading a sequence of frames of a video;

generating a set of frame documents generated by the machine learning model based on the sequence of frames, wherein each frame document of the set of frame documents corresponds to at least one of the frames of the sequence of frames;

reading commentary associated with the video;

providing the commentary as input to a language model;

reading embeddings generated by the language model based on the commentary, wherein the embeddings characterize the commentary, generating a commentary document in accordance with the embeddings;

determining a semantic distance between the commentary document and each of the frame documents selecting a subset of the set of frame documents having the lowest semantic distance to the commentary document;

identifying a consecutive subsequence of the sequence of frames associated with the subset;

providing at least two frames of the consecutive subsequence and the embeddings as input to a diffusion model; and reading a first frame generated by the diffusion model.

13. The computer program product of claim 12, wherein generating the set of frame documents comprises:

providing each frame of the sequence of frames as input to a machine learning model;

reading a feature map generated by the machine learning model based on at least one frame of the sequence of frames, wherein the feature map characterizes objects depicted in the at least one frame and semantic relationships among the objects; and generating the frame document in accordance with the feature map.

14. The computer program product of claim 12, wherein the operations further comprise:

providing the first frame and an end frame as input to the diffusion model, wherein the at least two consecutive frames comprise the end frame;

reading a second frame generated by the diffusion model;

determining whether the first frame and the second frame are equivalent; and determining whether a number of frames greater than or equal to an insertion threshold have been generated.

15. The computer program product of claim 12, wherein the operations further comprise:

inserting the first frame into the sequence of frames such that the video is modified.

16. The computer program product of claim 12, wherein the operations further comprise:

synchronizing an audio representation of the commentary with the video in accordance with the consecutive subsequence; and transmitting the video for presentation via a client computing platform.

17. A computer system for syncing commentary with videos, the computer system comprising:

a processor set;

one or more computer-readable storage media;

program instructions stored on the one or more computer-readable storage media to cause the processor set to perform operations comprising:

reading a sequence of frames of a video;

generating a set of frame documents based on the sequence of frames, wherein each frame document of the set of frame documents corresponds to at least one of the frames of the sequence of frames;

reading commentary associated with the video;

providing the commentary as input to a language model;

reading embeddings generated by the language model based on the commentary, wherein the embeddings characterize the commentary;

generating a commentary document in accordance with the embeddings;

determining a semantic distance between the commentary document and each of the frame documents;

selecting a subset of the set of frame documents having the lowest semantic distance to the commentary document;

identifying a consecutive subsequence of the sequence of frames associated with the subset;

providing at least two frames of the consecutive subsequence and the embeddings as input to a diffusion model; and reading a first frame generated by the diffusion model.

18. The computer system of claim 17, wherein generating the set of frame documents comprises:

providing each frame of the sequence of frames as input to a machine learning model;

reading a feature map generated by the machine learning model based on at least one frame of the sequence of frames, wherein the feature map characterizes objects depicted in the at least one frame and semantic relationships among the objects; and generating the frame document in accordance with the feature map.

19. The computer system of claim 17, wherein the operations further comprise:

providing the first frame and an end frame as input to the diffusion model, wherein the at least two consecutive frames comprise the end frame;

reading a second frame generated by the diffusion model;

determining whether the first frame and the second frame are equivalent; and determining whether a number of frames greater than or equal to an insertion threshold have been generated.

20. The computer program product of claim 17, wherein the operations further comprise:

inserting the first frame into the sequence of frames such that the video is modified.

* * * * *